United States Patent Office 2,715,783
Patented Aug. 23, 1955

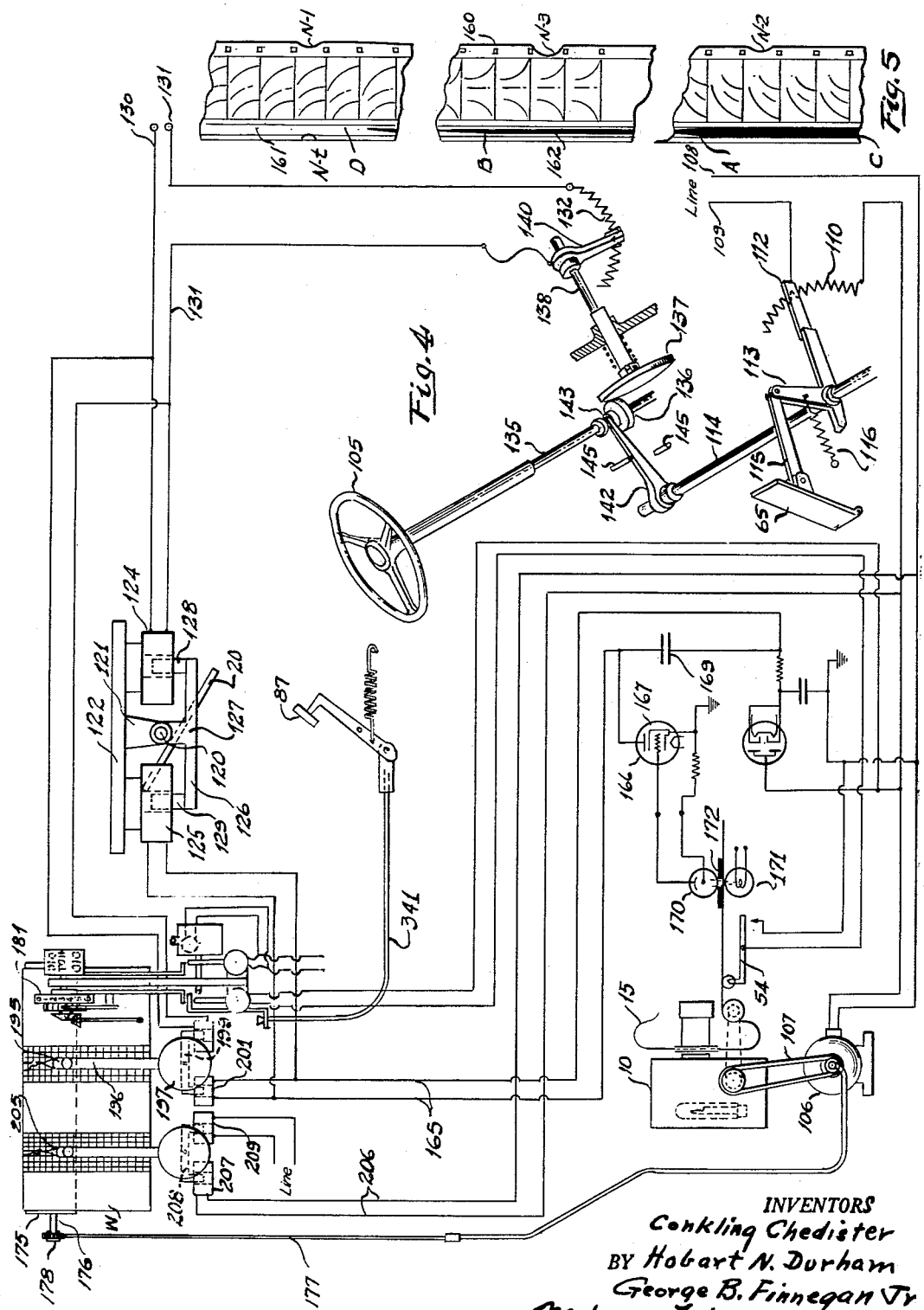

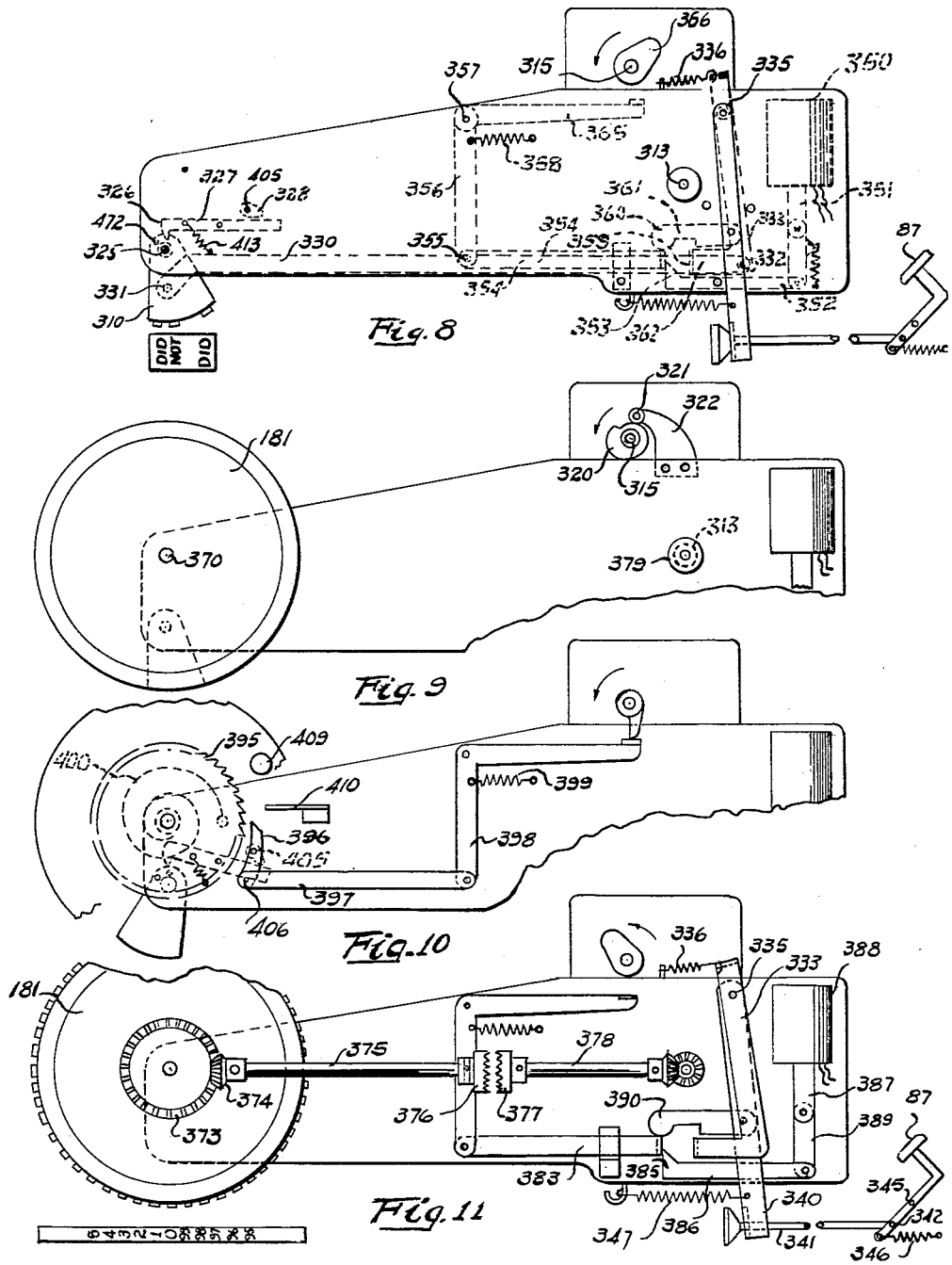

2,715,783

TESTING AND TRAINING MECHANISM

Conkling Chedister, Livingston, N. J., Hobart N. Durham, Manhasset, N. Y., and George B. Finnegan, Jr., Mountain Lakes, N. J.

Application June 30, 1950, Serial No. 171,434

12 Claims. (Cl. 35—11)

The invention relates to automatic mechanisms for testing and training operators of machines, especially dirigible vehicles such as automobiles and aircraft, and for recording the results of such tests.

Objects and advantages of the invention wil be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 4 is a diagrammatic view of mechanism and circuits for making graphic records of driving speed and vehicle steering;

Fig. 5 is a diagrammatic view of a motion picture film for use in the mechanism, showing the optical steering track and control notches in the film;

Fig. 8 is a fragmentary detail, in side elevation, of a portion of the printing arm, taken on line 8—8 of Fig. 6;

Fig. 9 is a view similar to Fig. 8, taken on line 9—9 of Fig. 6 with parts removed;

Fig. 10 is a view similar to Fig. 9, but including the parts for positioning the printing wheel;

Fig. 11 is a similar view taken on line 11—11 of Fig. 6;

Fig. 12 is a fragmentary enlarged sectional detail of the clutch construction and control contained in Fig. 2; and Fig. 13 is a similar view thereof showing the clutch engaged.

Figure 1:
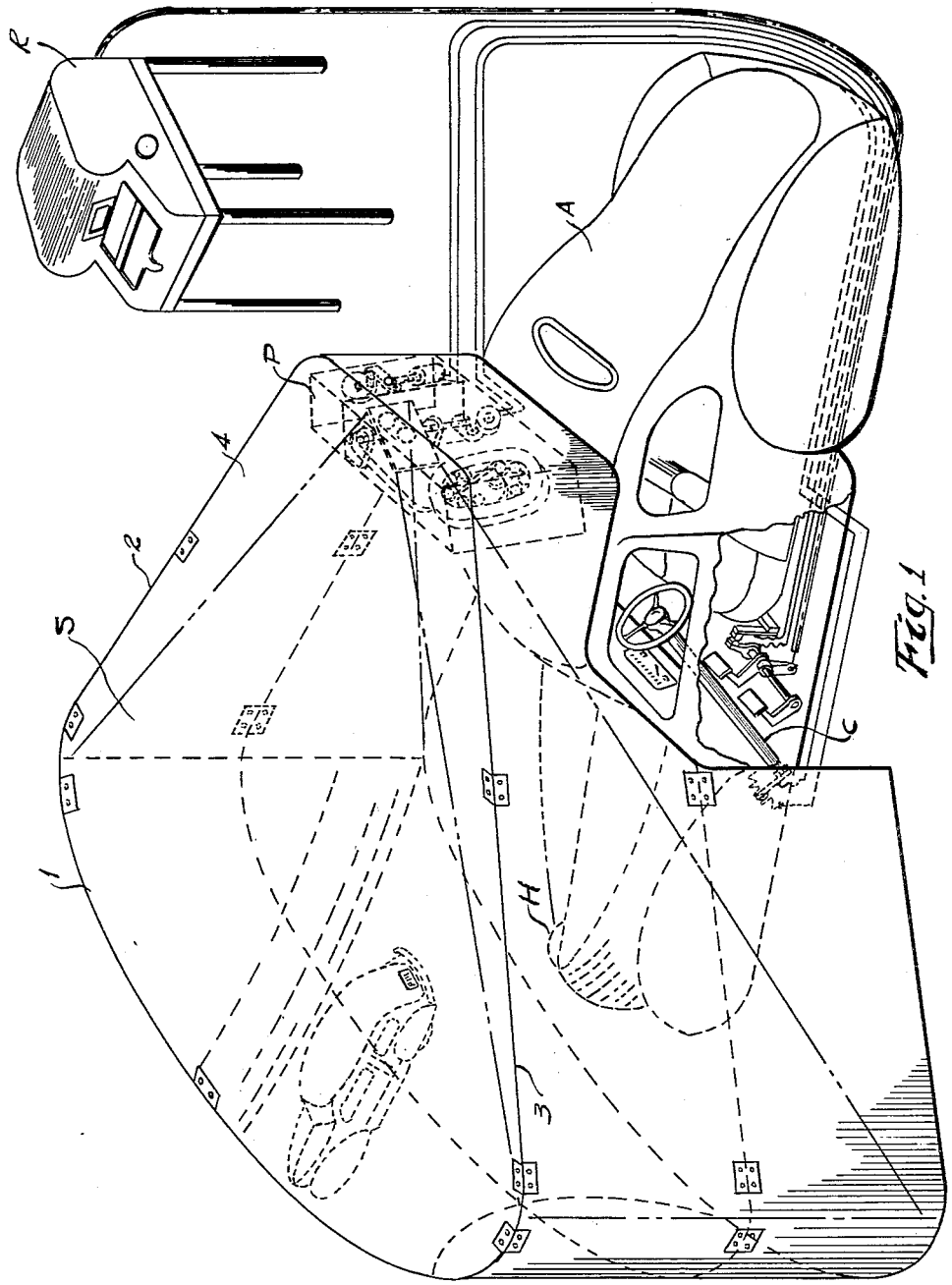
Fig. 1 is a partly diagrammatic perspective, with parts broken away, of an assembled apparatus embodying the invention.

The invention is directed to providing new and useful mechanism adapted to test and analyze the actions and reactions of a person in operating the control devices of a vehicle under conditions simulating those of an actual vehicle in use, said mechanism being also adapted to record and produce a permanent record of the analyses. One object of the invention is educational, operating to teach proper driving and to correct faults of the individual.

The invention also tests the ability of the individual to handle the vehicle controls under numerous situations, both common and unusual, simulating those which actually occur during operation of a vehicle. The mechanism is designed to detect and analyze the actions of the operator during each situation and to record the analytic results in words and figures against a predetermined norm or correct operation in each case and to deliver a record of such analyses to the operator. Thus a further important object of the invention is accomplished by subjectively impressing the operator with his own individual faults and shortcomings immediately after detection thereof. Hence the common tendency of the individual to disregard general warnings and illustrations of the faults and accidents of others is counteracted by the invention, which brings directly home to the individual his own personal faults and habits and points them out as they relate to his actions and reactions in circumstances simulating those of actual vehicle operation and traffic conditions.

Likewise the invention provides a novel and highly effective means of publicizing or directly disseminating safety propaganda and impressing the users of the mechanism with the causes of accidents and the importance and necessity for safe driving. In this connection the sheet upon which the printed record is produced and delivered by the mechanism may also conveniently contain additional printed data in the nature of general instructions or propaganda with regard to safety. Combined with such printed data or arranged for distribution therewith may be advertising matter pertinent to the subject uppermost in the mind of the operator, such as advertisements of liability insurance companies, automobile manufacturers, public safety organizations and the like.

The mechanism of the invention is designed to present the recorded and printed analyses of the operator's actions and reactions in tabular form so that the record of the operator for each incident of the test and his general average or total for the several incidents of the test is compiled and presented in the form of a totalized score, which score may be compared with the norm or predetermined score for perfect operation of each incident and of the total test. Thus the mechanism may be also utilized for purposes of amusement, providing a competitive appeal in that the operator will try to get a higher score than that of his associates or will try to better his own score or test himself under varying personal physical conditions, such as fatigue, intoxication and the like.

In connection with the foregoing general objects and advantages of the invention, we provide a mechanism which is wholly automatic in its operation, enabling the individual operator to subject himself to a complete series of tests and to obtain his printed and tabulated record without the presence or assistance of an attendant or other human agency. Thus the invention lends itself ideally to organization in a coin-controlled machine which may be stationed for operation by the general public.

In conformity with the foregoing, in its present preferred embodiment the invention provides a mechanism having a set of standard vehicle controls—in the case of an automobile, the driver's seat, steering wheel and brake, clutch and accelerator pedals. In the case of aircraft-pilot testing, the conventional aircraft control devices would be substituted for those of the automobile and it is understood that the broad principles of the invention are not limited to the operation of any specific form of automotive or vehicular control.

Combined with said vehicle controls, the mechanism provides means for presenting to the operator at the controls the visual impression that he has actually when operating a moving vehicle under actual road and traffic conditions. This may be accomplished in various suitable ways. In the present preferred embodiment, the operator looks at the projection of a motion picture film which has been taken from a moving vehicle and so presents a moving picture of a road or street such as would be seen by an operator actually driving a car.

The invention is designed to present a series of incidents to the operator requiring him to exercise the vehicle controls in various ways during the test. Preferably the operator is given the impression of driving the vehicle along a conventional road or course and various traffic incidents are prearranged to occur successively during the driving course. In the preferred form of the mechanism, such incidents are designed to take place in the motion picture presented on the projection screen wherein they occur successively and in an apparently natural manner just as might happen in normal operation of a vehicle on such a course. Thus a portion of the projected motion picture may be devoted to a steering test, and there may be shown a straight road, curves, sharp corners, a parked car and/or conditions requiring the passing of a moving car. Incidents to distract the driver's attention from the road or sudden obstacles requiring quick and accurate steering, and the like may all be presented to the driver to require him to exercise steering ability.

Another portion of the motion picture film may be devoted to incidents requiring braking reactions, such as might be occasioned by a person suddenly stepping from in front of a parked car, a child falling from a bicycle, the sudden appearance of a car issuing from an obscured lane, or the quick change of a signal light. In other incidents the driver may be subjected to tests for color blindness, such as the showing on the film of red and green signal lights or other signals or driving directions presented in various colors to determine whether or not the driver is color blind, especially to colors utilized in ordinary traffic operations. Other tests may be designed to test the driver's reactions and ability to withstand glare, such as would be caused by oncoming headlights of an approaching car at night. The psychological reactions and effects of situations on the driver may also be submitted to test, as for example the ability of a driver to extricate himself from a sudden dangerous or disturbing situation and accordingly the projected film may involve the driver in one or more situations for that purpose. Similarly the film, or mechanism timed to cooperate in conjunction with the film, may subject the driver to distracting incidents or influences, such as the sudden appearance of a disturbing incident or object at the side of the road which might cause the driver to turn his head or interrupt his concentrated attention to the driving problem. Suitably timed and arranged incidents occurring with or shortly after such peripheral distraction may be arranged so as to subject the driver to a test of concentration or the like.

It will be clear that a multitude of other incidents, similar in general to those hereinbefore described, may be provided. Furthermore, the various tests or reactions and requirements evoked by such incidents may be isolated or combined in numerous ways depending upon the sort of test it is desired to create by a given incident or series of incidents. For example some incidents may test the brake reaction time solely; others solely the ability to steer; others the accelerator control; while other incidents may combine several of these factors and/or others, as will hereinafter appear. One important test incident to which the driver may be subjected in any one of several ways is one testing his ability to foresee an impending or possible danger as he drives along the road and to take suitable steps to avoid the danger should it occur as foreseen.

It will be understood that the motion picture projection apparatus is suitably associated with the vehicle controls whereby the control of the projection is linked to the actions of the driver. Thus the speed of projection and therefore the apparent speed of the vehicle is linked to the accelerator and brake pedals whereby the appearance of fast driving may be given by speeding up the projector motor through use of the accelerator pedal and similarly the brake pedal may cause the projector to slow down and stop. Similarly the steering mechanism may be suitably coordinated with the apparent position of the vehicle on the depicted road so that motion of the steering wheel will apparently cause the vehicle being driven to shift laterally. Furthermore the steering mechanism or controls are suitably coordinated with the apparent forward speed of the vehicle whereby the rapidity of apparent lateral steering movement will depend upon the turning of the steering wheel and the forward speed of the vehicle, just as it does in actual driving conditions.

In accordance with the invention the actions and reactions of the driver or operator are detected and/or measured to ascertain and analyze their relation to the prearranged occurrences of the successive incidents on the motion picture film. In connection with an incident calling for application of the brake, for example, timing means is automatically synchronized with the projection of the film. Thus a timing device may be energized or sensitized at the beginning of the incident on the film which calls for application of the brake. The brake pedal itself may be connected with said timing device in any suitable manner, either mechanically or electrically, so that the application of the brake pedal will be registered against the timing device, thus determining the time (commonly called "reaction time") required by the operator to actuate the brake after the mental impression calling for brake operation has been received. Other incidents may call for a certain control operation, such as application of the brake, irrespective of a specific time factor. For example, the invention provides for registering whether or not the operator brought his vehicle to a full stop at a cross road so marked, the speed of application of the brake in such case being relatively immaterial. Similarly the steering movements of the individual operator may be analyzed and registered either for particular incidents or throughout the entire test course and preferably both. Thus the deviations in turning the steering wheel to either side of a predetermined norm or steering track or neutral course may be automatically detected and the total of such deviation ascertained. The foregoing are merely a few illustrative examples of the general manner in which driving errors or reactions may be ascertained, these and other examples thereof being hereinafter disclosed in greater detail, while many additional applications of the general principle herein disclosed will be obvious to those skilled in the art.

The invention further provides for making a printed record of the results ascertained and analyzed as hereinbefore described, said printed record preferably being made synchronously with the analyzing and registering operations.

In certain respects the present invention comprises improvements on the devices disclosed in Durham and Finnegan Patent No. 2,269,444 of January 13, 1942, and in Chedister Patent No. 2,341,312 of February 8, 1944; in other respects it comprises an independent invention.

In the devices disclosed in said patents it has been impossible, when using a motion picture to create the illusion of travel along a road, to provide for alternative situations arising when the operator exercises a choice of action when confronted with a test incident which presents such a choice. For example, let us suppose that in the test picture a pedestrian suddenly appears in the path of the driver's car, the object being to test whether the "driver" reacts promptly enough, as by applying the brake, to avoid hitting the pedestrian. Obviously the same motion picture cannot portray both results, depending upon how the driver reacts. In taking the picture, either one result or the other must be shown. Thus the picture can show the driver's car coming to a quick stop and the pedestrian escaping after the brake is applied; but if the "driver" in the testing device fails to apply the brake in time, the same innocuous result would appear in the projected picture. Thus although the score card would record the fact that the driver being tested failed to brake in time, the driver would have the visual impression from the picture at the time of the incident that his failure caused no harm. On the other hand, the motion picture can be taken so as always to show the picture of the accident resulting from hitting the pedestrian; but then the test driver who reacted in time would receive the wrong impression from the picture.

One object of the present invention is to provide means whereby either of alternative situations can be portrayed to the driver as the consequence of his taking or failing to take the proper action when the choice is presented to him. Thus, in the above example to the driver who reacts to the appearance of the pedestrian by braking soon enough, the picture will present the sequence with the pedestrian escaping; but when the driver fails to brake in time, a different picture will appear, showing the results of hitting the pedestrian. By this feature of the invention very dramatic and impressive effects can be obtained. Test drivers can be caused to see and experience the effects of their driving faults and failures as well as receiving a permanent record and scoring thereof at the end of the test. A driver who actually sees depicted the mangled body of the victim of his carelessness or inability receives a lasting warning which cannot be imparted in any other way in safety. In practice this feature of the invention may be realized by providing two projectors carrying films showing the alternative situations, together with means whereby the appropriate picture is presented by the projector selected in accordance with the actions of the driver.

Another object of the invention is to utilize sound effects selectively in the presentation of the test film. Such sound effects are useful to heighten the illusion in certain cases, as in the case of an accident as described above, wherein a sound record can be selectively cut in with the projector showing the accident sequence. Sound can also be introduced as background noise in connection with the main test film, or can be selectively introduced for the purpose of giving directions to the driver before and during the test.

Another object of the invention is to provide means whereby the energization of various circuits for operating the several selective devices, such as the secondary projector, the sound mechanism and other intermittently operated devices, are effected by control means associated with the test film. By such means any or all such devices can be selectively energized or conditioned to operate in connection with the operation of one or more of the vehicle controls (such as the brake, accelerator or steering wheel), and such selection can be predetermined for a particular test film and be varied from film to film. In this way the same basic film or sequence of pictures can be used as the basis for a variety of different tests based on the same pictorial incidents, merely by varying the control means with relation to the film. In the present preferred embodiment, said control means are designed to cooperate with notches of varying depths in the edge of the film.

Another object of the invention is to provide improved recording and printing means, preferably operable at a point remote from the testing mechanism. Such means are adapted to make graphical records of certain test results, such as driving speed and steering throughout the test course. In connection therewith the invention provides a novel form of record sheet on which both graphical records and numerical scoring are made during the test.

Another object of the present invention is to provide means whereby the driver being tested will be compelled to drive the test vehicle at a reasonable minimum speed, so as to prevent the driver from going through the test at too low a speed for proper testing and also to prevent a driver from seeking an improper advantage by trying to go through the test while holding his foot on the brake pedal. In the present embodiment, this object is accomplished by requiring the driver to keep the accelerator pedal depressed a minimum amount to hold closed the projector-lamp-energizing circuit, lest the lamp be extinguished and the scene disappear. Coupled with such means the invention provides for maintaining energization of the lamp circuit at selected times when the brake should be applied or the driver should remove his foot from the accelerator for some other proper reason.

In general the present preferred form of the invention comprises a set of driving controls arranged as in an automobile, with a projection screen positioned before the driver so as to exhibit motion pictures of a road scene. A motion picture projector is mounted to project against an inclined, pivoted mirror which throws the picture onto the road screen. The accelerator pedal of the car controls is linked to the projector drive so as to vary the speed thereof and thus give the illusion of road speed variations. The car brake is also adapted to control projector speed and in certain cases to stop the film on a single frame. The steering wheel is linked to the controls of the pivoted mirror so as to impart lateral steering movements to the picture on the screen, while said mirror is also subject to movements imparted thereto in accordance with a pattern, such as the curves in the pictured road, carried by a photo-electric control track on the film. Such a mechanism is disclosed and claimed in Chedister Patent No. 2,341,312.

In the present invention a second picture projector is provided for selectively projecting a picture of an alternative situation in those cases where the driver acts to produce a driving condition, such as an accident, different from that depicted in the main motion picture. Said second projector may be either a motion picture projector or a still film projector, with suitable controls for silencing the main projector and activating the second projector at the selected times and circumstances. There is also provided sound reproducing means which may also be selectively adapted to operate at times when the second projector is operated and also at other times, as may be desirable according to the particular test or training picture being shown.

The invention also comprises means for detecting, measuring, analyzing and recording certain actions of the driver during the running of the test film. All the types of tests mentioned in Patents 2,269,444 and 2,341,312 and other tests and effects can be produced by the present mechanism. The present invention includes means for making a continuous graphical record of the apparent driving speed of the test vehicle throughout the course, and also the conformity (or lack thereof) of the driver to the proper or safest steering course throughout the test film or any part thereof. These recording, measuring and timing devices are preferably constructed in a separate unit which can be placed and operated at a station remote from the testing machine, being connected thereto by suitable electrical and/or mechanical linkages.

It will be understood that the foregoing general description and the following detailed description as well are exemplary and explanatory but are not restrictive of the invention.

Referring now in detail to the present preferred embodiment of the invention, illustrated by way of example in the accompanying drawings, an assembly of the various units comprising said preferred embodiment is shown in Fig. 1. Said units include a conventional automobile body A, used so as to secure the greatest realism of environment in conducting the test. The car A is provided with the conventional driving controls, including clutch, brake and accelerator pedals and steering wheel, these controls being generally indicated by the letter C. Conveniently mounted atop the car body is the projection unit P, which comprises generally the two projectors, the projection mirror, the sound mechanism, and the various circuits and controls therefor, as shown in greater detail in Fig. 2 and hereinafter described. Unit P is electrically connected to the various controls of unit C, as indicated. A recording unit R, remote from the other units and linked to unit C by electrical and mechanical connections, contains the various timing, printing and inscribing devices shown in Figs. 4 and 6–11, and hereinafter described in detail.

The projected pictures appear on a screen 1, comprising part of unit S. Said screen is preferably of such size and is placed at such distance from the projector as to present a view of a road scene through the car windshield which appears to be of "life size." The screen 1 is preferably curved transversely, especially near its side edges, thus giving the illusion of lateral continuity to the scene and permitting considerable lateral swinging of the picture without distortion. In practice the width of the projected picture is somewhat less than the full width of the screen, so that considerable lateral displacement of the picture from the center of the screen can take place without loss of the whole scene. To reduce external light and to heighten the driver's concentration on the screen, side panels or walls 2 and 3 are preferably connected to the side edges of the screen 1, said panels converging toward and standing adjacent to the sides of the car near the windshield. If desired the screen unit may also be provided with a top cover 4, overlying and connecting the screen and walls. As shown, the screen and panels may be formed in sections and hingedly connected together for ease of portability and assembly.

*Projection unit*

Figure 2:
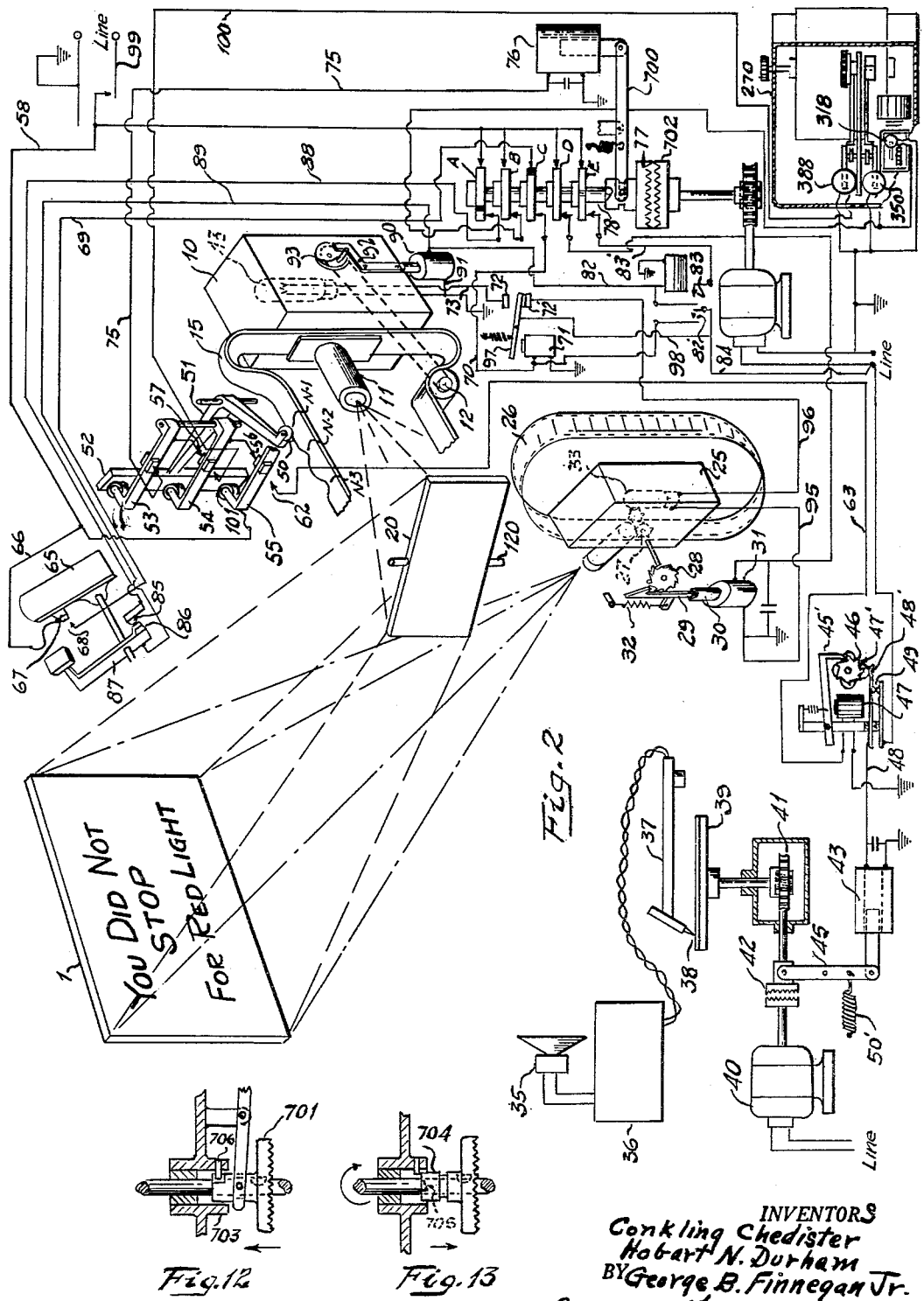
Fig. 2 is a diagrammatic view of a portion of the testing mechanism, showing electrical circuits between vehicle controls, motion picture and slide film projectors, and sound apparatus.

We shall now describe the projection unit, marked P in Fig. 1 and shown in diagrammatic detail in Fig. 2. A primary element of this unit is the motion picture projector 10, having projection lens 11, motor-driven film feed 12, drive motor 14 (Fig. 4) and lamp 13, adapted to project the motion pictures carried on the endless film 15. Preferably said film is mounted on a suitable continuous film feeding and guiding mechanism for heavy duty continuous feed of a large quantity of film, the feed mechanism shown in Chedister Patent No. 2,341,313, of February 8, 1944, being preferred.

For purposes of projecting onto the screen 1 and permitting lateral movements of the projected picture on the screen to give the impression of turning and steering movements, the projector is mounted to project its beam into one face of the pivotally mounted mirror 20, which normally lies at 45° to the line of projection and to the plane of the screen. Means for imparting control and steering movements to such a mirror are disclosed in Chedister Patent, 2,341,312 and it will be understood that the mirror 20 is so designed and equipped in the present mechanism. Certain aspects of the mirror control relating to the special recording system of the present invention are shown and will be described in connection with Fig. 4 hereof.

In accordance with the invention, a secondary projector 25 is provided for selectively presenting alternative pictures or legends on the screen 1. As shown, projector 25 is a still or slide film projector designed to show a single picture or a sequence of stills on the screen for any desired time. An endless film 26 carrying a series of still pictures and/or legends is fed by suitable sprocket feed 27, actuated for step-by-step feed by ratchet 28 which is moved by pawl 29 when retracted by plunger 30 of solenoid 31 against the pull of spring 32. Lamp 33 is the conventional illuminating means for said projector.

While still projector 25 is shown as the present preferred form for the secondary projector, it will be understood that for many purposes a motion picture projector will be equally or even more useful therefor. When so used as the secondary projector, such motion picture projector may be positioned in the same way as the still projector 25 so as to throw its pictures directly onto the screen 1, or if desired a second mirror, like mirror 20, can be mounted in the path of the second projection beam, so as to provide for lateral movements of the motion pictures from the second projector. However, whether a still or a motion picture be used for the secondary image, it will be understood that said secondary projection will be selectively operated to provide the alternative image at times when no picture is being projected by the primary projector. When the secondary projector is for motion pictures, the film feed thereof will normally be operated continuously in synchronism with the primary projector, the lamp 13 being normally lighted and the lamp of the secondary movie projector being normally out, the reverse arrangement of lighting taking place when alternative scenes from the secondary projector are being shown. In similar manner the film 26 of the still projector will be kept in step with the sequence of the primary movie film, the scenes of the still film being advanced by the feed mechanism 27—31 regardless of whether or not the lamp 33 is illuminated. The embodied means for selectively controlling the operations of the two projector feeds and lamps will be described later herein.

A third element of the projection unit P comprises the sound mechanism shown in the left-hand portion of Fig. 2. Like the secondary projector, said sound mechanism is adapted to be operated at selected times, in accordance with the sequence of the test and, at certain times, in accordance with alternative actions of the person being tested. The control means for such selective operation will be described later herein. The sound mechanism itself is conventionally shown as a loud speaker 35 and amplifier 36 connected to pick-up 37 which engages a record 38 on turntable 39. The turntable is driven by a motor 40, preferably continuously energized throughout the test, but linked to the reduction-gear drive 41 of the motor by the selectively operable clutch 42. Said clutch is designed to be so operated by solenoid 43, the plunger 44 of which is linked to one end of lever 45, the other end of which is linked to the slidable member of clutch 42.

While the relatively simple disc-type sound mechanism is shown, it will be understood that other types of sound reproduction means can be used. For example, if a movie projector be used for the secondary projector as described above, it may carry a sound head and a film with a sound track. In such case the sound reproduction from the secondary movie film may be selectively utilized either at the times pictures are projected from the secondary projector, and at other times as well, it being understood that the secondary film will be fed in synchronism with the primary film and thus the sound from the secondary film may be utilized regardless of whether the pictures therefrom are being projected. This effect can be obtained by selective energization of the sound head of the secondary projector independently of energization of the lamp thereof. In this way background noises, such as a car motor, horns and other traffic noises, can be made while the primary film is being projected, and verbal instructions can be given the driver from time to time without interfering with the use of the photoelectric steering control track carried by the primary film, as shown in Fig. 5. Such supplementary sound effects can also be obtained alternatively from the disc record mechanism as shown in Fig. 2.

Referring now to the embodied means for selectively controlling the operations of the two projectors and the sound device described above, the invention provides that the principal control therefor is carried by the primary film 15 itself, or by some equivalent means operated in sequence therewith, such as a cam. As shown (Fig. 5) the film 15 is provided with notches along one edge thereof, said edge preferably being the one opposite to the edge which carries the steering track. In accordance with the invention said notches are of different depths so as to actuate control switches in a selective manner as hereinafter described. As shown notch N–1 is a shallow notch, N–2 of intermediate depth and N–3 is the deepest, but it will be understood that a greater number and variety of such control notches could be provided, and may be on either or both edges of the film.

A switch-operating roller 50 is positioned to engage the edge of the moving film 15 as it is fed to the projector. Said roller is at one end of a bell crank 51, the opposite end of which carries a roller-engaging bar 52. Three rollers engage the face of said bar, being mounted at the free ends of three switch arms 53, 54 and 55, all of which are mounted to pivot on a common shaft or pin. Said switch arms are connected to the pivot pin so as to be moved to different extents by movement of the bar 52. When the roller 50 is riding normally against the smooth outer edge of film 15, all three of said switch arms are electrically interconnected. That is the contact 56 from arm 54 engages arm 55 and similarly contact 57 from arm 53 engages arm 54.

By means of the shallow film notch N–1, the sound reproduction equipment is selectively energized or thrown into operation. When roller 50 falls into notch N–1, arm 55 is moved to engage contact 62 while simultaneously disconnecting the circuits through contact 56. Line 63 is thus connected with power line 58, thereby actuating solenoid 43 to close clutch 42 and thus set the record turntable 39 in motion. Thus at any desired time in the sequence of film projection oral instructions may be given to the driver or other sound effects imparted to him.

The record 38 may be caused to play for as long a period as desired at any particular part of the primary film projection, the control thereof also being effected by means of the notches N–1 on said film. For this purpose a ratchet relay is provided in connection with control of clutch 42. Said relay comprises a pivoted lever 45' arranged to engage ratchet 46, an electromagnet 47 adapted to attract the free end of said lever 45', a branch circuit 48 connecting with power line 58 and terminating in a switch moved by cam 47' on shaft 48' to alternately open and close contact 49 of magnet 47.

Thus when the ratchet relay is energized (by control action of notch N–1) solenoid contacts 49 close to supply current to solenoid 43 thereby moving lever 45 to close clutch 42. The record will thus continue to play until second notch N–1 comes along on the film. Said second notch causes current to flow over line 63 to advance ratchet relay to next position thereby rotating cam 47' to open switch 49. Thus the current supply is cut off to solenoid 43, releasing lever 45 urged by spring 50' to disengage clutch 42. Thus the record is started and stopped by successive notches N–1 on the film.

In accordance with the invention, means are preferably provided for requiring the driver to operate the drive of the projector so as to maintain a certain minimum apparent speed of driving. Such arrangement is desirable to prevent drivers being tested from "loafing" through a test and thus trying to better their scores by excessively slow presentation of incidents in the film. Said means comprises the accelerator pedal 65 which, by connections hereinafter described in connection with Fig. 4, is adapted to vary the speed of the projector drive and thereby vary the apparent speed of travel of the test vehicle with relation to the motion picture scene. The arrangement under consideration requires the driver to depress the pedal to a certain point, so as to maintain a predetermined apparent speed or otherwise the projector lamp is extinguished and the picture becomes invisible although the projector continues to feed film at an idling speed. The disappearance of the motion picture serves to remind the driver that his speed is too low, so that by depressing the accelerator pedal the light is re-energized and the required minimum apparent speed is resumed.

The circuits for effecting this operation include line 66 which branches from line 58 and is fixed to contact 67 on the under side of the movable portion of pedal 65. When the pedal is depressed to a predetermined point said contact engages contact 68, which is designed to remain engaged so long as the pedal is held at or below said point. Contact 68 is at the end of line 69 from which a branch 70 leads to relay 71. When energized the relay closes the circuit through contact 72 and thereby energizes projector lamp 13 through circuit 73.

While the above-described arrangement causes the lamp 13 of the primary projector 10 to be extinguished when the accelerator pedal is not depressed, the invention preferably provides for otherwise illuminating the screen 1 on such occasions. For this purpose lamp 33 of the secondary projector is designed to be lighted whenever the lamp 13 is not lighted. As designed, line 96 of lamp 33 is connected to terminal 72' of relay 71 so that when the relay is not energized spring-urged switch arm 97 engages said lower terminal 72'. The switch arm is connected to the main line 84 by line 98 and thus lamp 33 is energized by closing of the main switch 99. Thus a suitable legend may be displayed on the screen at the beginning of the test, as for giving instructions, and that legend or one appropriate to the occasion may be made to appear on the screen whenever the driver takes his foot off the accelerator during normal driving situations during the test. Such legend might read "Keep Your Foot On The Accelerator" or "Step On The Gas" or words to that effect.

For testing purposes certain episodes or incidents on the test film require application of the brake, as for example when a red light is suddenly flashed on as the driver starts to cross an intersection. In connection with such a test incident, the invention provides for maintaining illumination of the lamp of the primary projector independently of the position of the accelerator during a selected period of time and sequence of events. For example, in the illustrative incident mentioned, the sudden appearance of the red light will constitute a signal for the driver to apply the brake as soon as possible. Some drivers will react more quickly than others and the invention is designed to measure the time required by each driver to react to the signal (less than one second in nearly all cases). Some drivers will not apply the brake at all, because of color blindness or inattention or other reasons, and the invention is also designed to detect and record such failures. In the present embodiment a sequence of one second is regarded as a sufficient period for making all the required tests based on such incident— that is, one second elapsed time from the projection of the film frame in which the red light first appears, in the incident illustratively mentioned. During that period, accordingly, the circuit of lamp 13 remains energized even though the driver takes his foot off the accelerator, and stays energized thereafter, provided he steps on the brake.

For this purpose, a lamp-energizing circuit is provided for holding lamp 13 lighted for one second after the appearance of the red light, said circuit being activated by a notch N–3 on the film. When such deep notch N–3 actuates the lever 51, switch 53 is moved to close circuit from line 58 through line 75, thereby to energize solenoid 76. The solenoid is adapted to close clutch 77 to drive shaft 78 for a cyclic period of one revolution from motor 79 through gear reduction 80.

As designed, said clutch is normally held open by spring-urged link 700. As shown in Figs. 12 and 13, the members 701 and 702 of clutch 77 are housed in a stationary casing 703. The upper face of slidable clutch member 701 is provided with a collar 704 having an inclined notch 705, adapted to cooperate with fixed pin 706 which projects from casing 703, normally to engage said notch and prevent rotation of the shaft (Fig. 12). When the clutch is engaged, member 701 moves away from the pin, disengaging it from the notch and permitting rotation of the shaft. In this position (Fig. 13) the upper surface of collar 704 rides against the pin which thus prevents the clutch from opening until the shaft has completed a revolution, even though the solenoid 76 is only momentarily energized, whereupon the notch 705 permits the collar and clutch member 701 to rise, disengaging the clutch and interlocking with the pin.

Five contact discs A, B, C, D and E are mounted on shaft 78. Disc C is adapted to supply current to lamp 13 from line 84 through energization of relay 71, such current being maintained while the disc is stationary and also for one second of its rotation, during which the driver may apply the brake after the red light appears. Thus during a sequence requiring braking, the lamp 13 of projector 20 will be illuminated even though the accelerator pedal 65 is not depressed as previously described, this condition being maintained during the one-second cycle determined by the rotation of disc C.

Means are also provided for stopping the movement of the projector on a frame of the film while continuing the illumination thereof so as to give the illusion of stopping when the brake is applied. If the driver applies the brake as required, movement of the brake pedal 87 closes contacts 85 and 86. This closes a circuit to line 84 through disc A, line 88, line 89 and solenoid 90. Lead 91 from the solenoid taps into the ground side of the circuit of lamp 13. As shown the solenoid is connected to actuate a bellcrank 92 to cause same to engage a pin 93 projecting from the face of fly-wheel 94 on the drive shaft of the projector 20. Thus depressing the brake pedal will cause the projector to stop and the scene projected as a still picture through the arrested frame, so long as the brake is depressed and contacts 85—86 closed.

The invention also provides means whereby, if the brake is actuated during the one-second period after the red light appearance, the projector lamp 13 will remain illuminated thereafter during the remainder of the braking incident sequence. This feature of the invention is designed to operate regardless of whether the brake is applied momentarily or is held on for a time after it is applied. As embodied, the current supplied to solenoid 90 from line 69, as previously described, also supplies current to relay 81 through branch line 82. The relay, when energized, is designed to close switch 83, thereby communicating with main line 84 through lead 83' and rotating disc E. When this circuit is so closed, energizing current will flow to the circuit of lamp 13 because the energization of relay 81 also closes switch 82' thereby bringing current from line 84 to energize coil 71 and maintain switch 72 closed.

However, if the brake is not actuated within the one-second holding cycle of disc C, then the primary projector lamp 13 is extinguished and secondary projector lamp 33 is illuminated in accordance with the circuit previously described. Thus, in the illustrative driving incident under consideration, if the driver fails to apply the brake within one second after the red light appears on the screen, the motion picture of the road scene will disappear and the still film will be projected on the same screen to show a legend such as that seen in Fig. 2, e. g. "You Did Not Stop For The Red Light." Said legend will remain on the screen for the remainder of the incident sequence determined by one rotation of shaft 78 (which may total, say, two seconds) until the notch-controlled circuits are broken by the disc switches on shaft 78.

Other incidents may be arranged for similar control wherein the secondary projector is used to portray graphic alternative effects. For example, if the driver fails to apply the brake in time to avoid hitting a pedestrian in the driver's path in the road picture, the secondary projector can be used to show a picture of a mangled body, while through control action of notches N–1, the impression of a serious accident can be enhanced by appropriate sound effects. These devices therefore serve to make a lasting subjective impression of his shortcomings upon a driver and also greatly heightens the realism so desirable in testing machines of the type described.

Positioning of slide or still pictures for projection at the appropriate times and sequences is effected through the control of notches N–2 on the primary film. Such notches of intermediate depth cause switch arms 54 and 55 to be moved and thus to send current to solenoid 31 via line 100, thereby to advance slide film 26 one frame for each notch. Accordingly, the appropriate still picture or legend on film 26 can be positioned for projection at the desired times selectively determined by operation of the test controls, the primary film being notched as desired to that end.

*Control unit*

The principal elements of the vehicle control unit C and their linkages to the projection unit P and the recording unit R are shown in Fig. 4. As embodied these elements comprise the accelerator pedal 65, the brake pedal 87 (both previously referred to in connection with the description of unit P, Fig. 2), and the steering wheel 105. A clutch pedal may be provided for certain types of tests and training, but as its use is disappearing from modern cars it will ordinarily be omitted and is not here shown.

The primary motion picture projector 10 is shown for projecting film 15 as previously described, being driven by variable speed motor 106 which is linked to the drive shaft pulley of the projector by drive belt 107. As previously stated, said motor is varied in speed according to the position of the accelerator pedal. For this purpose the power lines 108, 109 of the motor is provided with a variable resistance 110 the resistance of which is varied by movable contact 112 at the free end of bell crank 113 which is mounted to turn with shaft 14. The other end of said bell crank is pivotally connected by link 115 to the under surface of accelerator pedal 65. The pedal, like that of a car, is normally urged to its upper position by spring 116 connected to the bell crank.

In accordance with the invention means are provided for imparting pivotal movements to the mirror 20 about its vertical axis so as to shift the projected picture laterally across the screen 1. The mirror 20 is mounted for pivotal movement about a vertical axis 120. As shown the mirror is fixed to the vertical axle member 120, the latter being journaled in bracket arms 121. Said brackets project from the plane of a suporting plate 122.

Said pivotal movements are imparted to the mirror in one sense by movements of the steering wheel 105 and in the other sense in response to a predetermined pattern, preferably the steering course pattern of the route to be followed: said pattern being derived from a control track on the film itself as hereinafter described. For imparting these pivotal movements to the mirror, the invention provides two mirror-actuating coils 124 and 125 mounted at either side of the mirror axis and extending from the mirror bracket supporting plate 122. A bar yoke 126 is connected to the upper end of the axle 120 by a bracket member 127. Said yoke has at one end a solenoid core or armature 128 which extends into the coil 124 and at the other end a similar armature 129 extending into the coil 125. Said bar 126 in its normal position lies parallel to the axis of the projected beam from the lens of the projector 10 and thereby holds the mirror at the normal 45° angle as shown in Fig. 2. The field of coil 124 is subject to variations through actuations of the steering wheel 105 while the field of coil 125 is similarly influenced from the steering pattern on the projected film.

Referring first to the control of the field of coil 124 from the steering wheel 105, the coil is energized by means of a line circuit comprising the wires 130 and 131. Wire 131 is connected across a variable resistance 132, the resistance thereof being varied by turning movements of the steering wheel, thereby to vary the field of coil 124 in accordance with amounts corresponding to the turning of the steering wheel. As embodied, the steering wheel 105 is fixed to shaft 135 which has a slidable roller 136 engaging the face of the friction disc 137 on shaft 138. The resistor 132 comprises a conventional rheostat coil mounted with its upper surface in contact with a variably positionable contact member 140 on the end of shaft 138. Contact member 140 is adapted to sweep across the surface of resistor 132, the arcuate or sweeping movement being imparted thereto by movement of the steering wheel through the disc 137. It will therefore be clear that any movement of the steering wheel will impart a corresponding movement of the contact 140 across resistor 132 and thereby vary the field of mirror coil 124.

In accordance with the invention means are provided for coordinating the steering wheel control of mirror coil 124 with the varying speed of projection effected by the accelerator control 65 and for increasing the transverse movement of the projected picture with increases in projector speed at any given turning of the steering wheel. As embodied, the bell crank 113 of the accelerator control is fixed to transverse shaft 114 and said shaft also is fixed to and supports the arm 142. The free end of arm 142 is positioned in the groove of splined sleeve 143 fixed to roller 136.

As will be clear from the drawing, rotary motion of shaft 114 will slide roller 136 across the face of friction disc 137 to proportion the turning-effect of steering wheel 105 according to the movement of accelerator 65. Thus, the arc travelled by contact member 140 is the product of the turning moment of the steering wheel 105, times the ratio between roller 136 and disc 137. Stop pins 145 are provided to limit the movement of roller 136 from dropping off the face of friction disc 137 at its periphery and also preventing the roller from approaching too close to the center of the disc, which would allow considerable slippage between said members.

The movement of the steering wheel will produce a very limited arcuate movement of contact member 139, when roller 136 is in its normal position. However, when the accelerator pedal is depressed contact 139 will describe a greater arc for any turning of the steering wheel and will consequently effect a greater change in the current of mirror coil 124.

Referring now to the controls for the mirror coil 125, it will be understood that same is designed to impart arbitrary deviating movements to the mirror (and thereby to the road scene) in accordance with a pattern carried on the projected film itself. Referring to Fig. 5 it will be seen that the motion picture film 15 is perforated at 160 on one side only, the opposite side or track 161 being unperforated and having imprinted photographically thereon a track or pattern 162 of varying width. Said pattern 162 may be opaque while the remaining portion of the track 161 is transparent or the pattern 162 is transparent while the remainder of the track 161 is opaque. In either case the width of the pattern track 162 varies in accordance with the position desired to be imparted to the mirror 20 through the coil 125. Said pattern corresponds to the curvilinear track or course of the roadway projected from the motion picture film. For example as diagrammatically shown in Fig. 5, when the portion of the steering pattern is of median width as between lines A and B, the current in coil 125, through the photo-electric controls hereinafter described, is such that no deviating movement is imparted thereby to the mirror 20. The portion of the steering pattern or track A—C is shown of maximum width, capable of imparting a maximum deviation in one direction to the mirror 20 through the controlling coil 125. In the section B—D of the steering track or pattern, said track diminishes to a minimum or zero width, thereby imparting a maximum deviation of the mirror in the opposite direction.

The deviations of the mirror 20 corresponding to the pattern 162 on the film are effected by photo-electric controls so as to link the position of the mirror with that called for by the pattern on the film at any given moment. As embodied, the circuit 165 controlling the field of coil 125 is connected through a conventional amplifier 166 having tube 167 and condenser 169 to the output of a photo-electric cell 170. Said cell is positioned to receive the rays of an exciter lamp 171 which pass through a suitable gate 172 lying across the steering track or pattern 162 of the film 15 as it is fed from the projector 10.

As will be clear from the drawings, the amount of energy transmitted to the photo-cell 170 will depend upon the width of the track 162 and consequently said track width will determine the position of the mirror 20 insofar as the coil 125 is concerned. Thus when the track is of intermediate width, as in the section A—B, the output of the photo-electric cell will be of intermediate extent and thereby the coil 125 will tend to hold the mirror in the neutral or 45° position. Consequently a track of said intermediate width will be utilized when it is not desired to move the projected picture off its normal axis with respect to the hood of the car H (Fig. 1), and consequently said intermediate width track A—B will correspond to a length of straight road, on which proper steering would require no movement of the steering wheel from the normal or straight-ahead position. For indicating a right-hand turn the full width track B—C energizes the cell 170 and causes the mirror to swing the maximum extent so as to throw the picture on the screen the maximum distance to the left as viewed by the driver. That deviation of the picture will require the subject to turn the steering wheel to the right in order to hold the nose H of the hood of the car at the center line or appropriate point in the picture road for proper steering. Similarly when the track 162 diminishes to less than the intermediate width, as in section C—D, the mirror is swung in the opposite direction, moving the picture road to the right. This requires the subject to turn the steering wheel 105 toward the left in order to compensate for the deviation imparted by coil 125 and thereby, through the controls of coil 124 to bring the mirror to or hold it in the neutral or balanced position. Thus the mirror 20 and its projected picture are being continually influenced by the width of the pattern 162 on the film and the subject must continually steer with wheel 105 in order to prevent the picture road from moving out from under the steering point H of the car hood. In this way the illusion of actual driving and steering over a curving road or course is accurately simulated. By watching the character of the road unfolding in front of him and judging how it should be steered, a skillful driver will be able to hold the mirror practically motionless, thereby experiencing the illusion of travelling around curves while steering the car properly. However, if the driver neglects to turn the steering wheel sufficiently or oversteers, he will experience the illusion of driving toward or off the side of the road. As the projector is driven at greater speed through the accelerator control 65, smaller deviations in steering produce relatively great errors because of the time relationship between the travel on the road and the angle of steering.

While a photo-electrical steering control track is preferably printed on the film F as shown, certain features of the invention may also be achieved by using a control pattern separate from the film, such as a separate tape or cam for imparting movements to the mirror, either photo-electrically, magnetically or by direct mechanical linkage.

Figure 3:
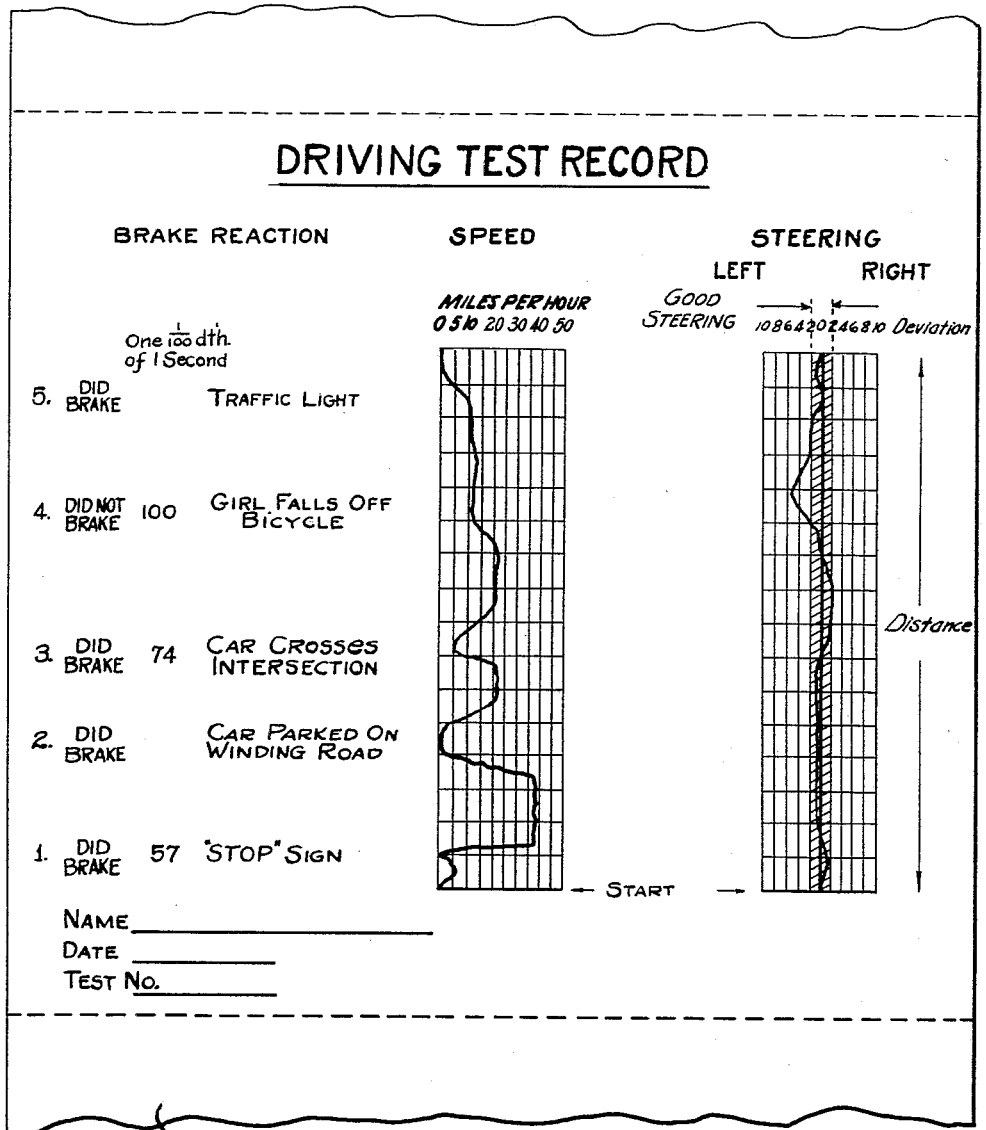
Fig. 3 is a view of a typical record sheet produced by the invention.

In accordance with the invention the unit R comprises means for recording in permanent written or printed form the manner of actuation of the various controls at selected points or incidents in the test motion picture. The form of record produced by the unit is shown in Fig. 3, the printing and inscribing of the various test results being preferably made on a transversely perforated web W. Said stylus is supplied with a feed tube 196 and reservoir 197 respectively, the latter for supplying the stylus with a suitable marking fluid.

Means are provided for positioning the stylus 195 correspondingly to the position of mirror 20, the two being The rear end of said arm is supported by a pin 294 which has a point bearing at its lower end in supporting plate 295. A similar plate 296 supports the upper end of pin 294, which is journalled therein. Both plates extend from an upright bracket plate 297 which is journalled to rock about transverse stationary horizontal shaft 298. Thus the stylus and its support can be oscillated up and down so as to maintain contact with the paper and to be lifted away therefrom when necessary. Transverse oscillatory motion is imparted to the arm 196 by means of double coil solenoid 299 which controls the position of an arcuate armature 300, the outer end of which is fixed to an arm 301 extending from pin 294. Said solenoid contains the two coils 200 and 201 (Fig. 4) which are responsive to the steering wheel and the steering track respectively and operates as previously described. The other stylus 205 and its controlling coils 207 and 209 for the speed indicator previously described, will be similarly constructed in the unit R.

Figure 6:
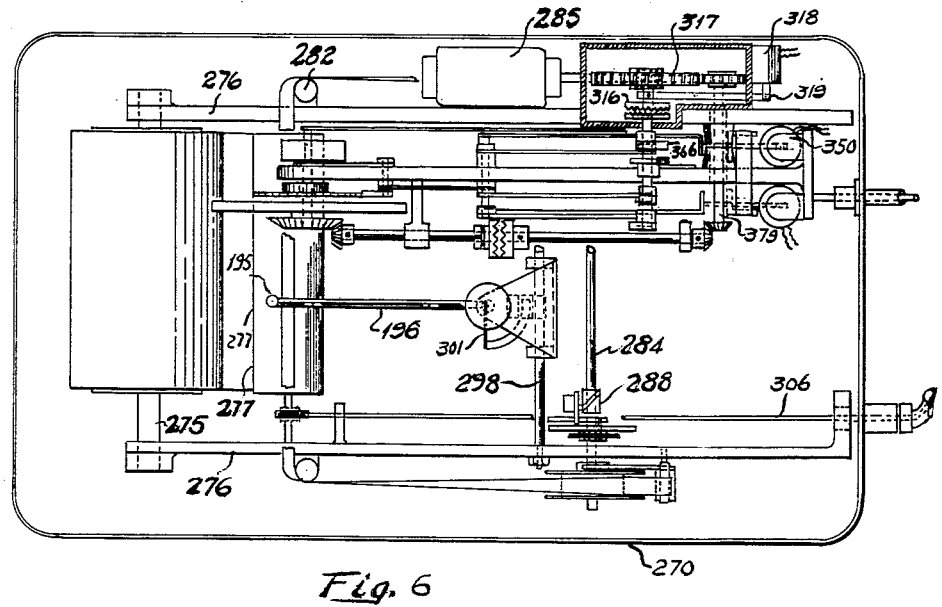
Fig. 6 is a top plan view of the printing mechanism with the cover removed.
Figure 7:
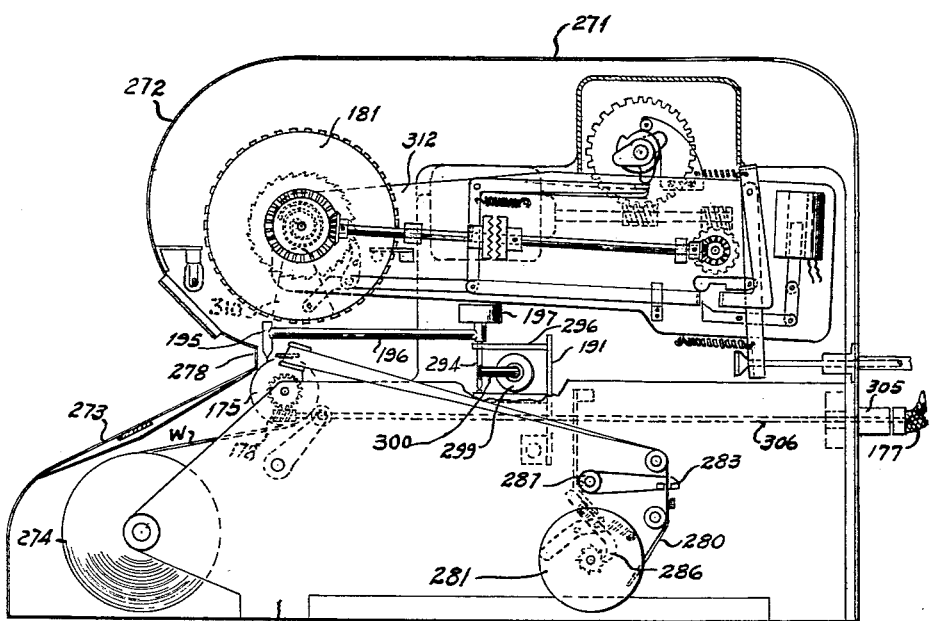
Fig. 7 is a side elevation of said printing mechanism with the side plate of the casing removed.

As will be clear from Figs. 6 and 7, the rotary drive imparted to web feeding and printing roll 175 is that produced by the flexible shaft 177 connected to projector motor 106 as previously described. The flexible shaft is coupled to recording unit R at 305 to drive the extension shaft 306 which, through worm and pinion gear reduction 178, imparts suitable paper feeding rotation to impression roller 175.

In accordance with the invention the recording unit R also contains the devices (previously diagrammatically indicated in Fig. 4) for registering and printing the brake reaction times of the driver and also the words "Did" and "Did Not" in accordance with the driver's operations of the brake pedal. Said printing devices are mounted in the upper part of casing 271 to overlie the impression roller 175, and the constructional details for the various setting and printing operations are largely shown in Figs. 8–11.

In general the printing wheel 181 (Fig. 4), the drive and setting means therefor, and the arcuately positionable segment 310 for printing the characters "Did" and "Did Not" are all mounted on a massive pivoted arm 312, the pivot bearing 313 therefor being a substantial distance from the free end which supports the printing wheel and segment. Thereby the printing members will fall through a fairly flat arc against the printing wheel when the arm 312 is released for that purpose.

Means for controlling the movements of printing arm 312 and for setting various instrumentalities connected therewith includes cam shaft 315 which extends horizontally across the top of arm 312 and is driven, through the control of clutch 316 and reduction gearing 317, from motor 285. The control of clutch 316 is effected through solenoid 318 and suitable linkage 319.

The embodied means for elevating printing arm 312 and releasing it for printing comprises cam 320 on shaft 315, the face of said cam cooperating with a roller 321 mounted at the end of an overlying arm 322 which is fixed to and extends upwardly from the top of printing arm 312. Thus the rotation of cam 320 gradually lifts arm 312 until it reaches the sharp fall of cam 320 whereupon it drops suddenly and a printing impression is made on web W against roller 175 through the printing ribbon from the printing wheel 181 and segment 310. It will be understood that the actuating of control solenoid 318 for connecting cam shaft 315 to the driving gears will be effected by suitable circuits, controlled through the medium of the notches N-3 on film 15. By this means, whenever an incident involving an application of the brake pedal is presented by the film, the cam shaft 315 will be set in motion for controlling the sequence of movements in the registering and printing operations as hereinafter described. As shown in Fig. 2, disc B on shaft 78 is adapted, upon the beginning of rotation, to energize solenoid 318 through line 720. The construction of clutch 316 is similar to that of clutch 77, so that it will remain engaged for a complete operating cycle after initial energization of solenoid 318.

In accordance with the invention, means are provided for setting the printing segment 310 in the appropriate position, determined by whether or not the driver actuates brake pedal 87 during those incidents, determined by notch N-3, where brake actuation is called for by the film. As will be seen from the drawings, the segment 310 is provided on its under-surface with the printing characters "Did" and "Did Not," the latter set of characters being normally in printing position. Thus, if during an incident calling for application of the brake, the driver fails to depress the brake pedal, the segment 310 will automatically print the words "Did Not" when the printing arm falls.

The mechanism, as shown in Fig. 8, provides for rocking the segment 310 forwardly out of its normal position so that the characters "Did" come into printing position only when the driver operates the brake pedal 87 during an incident when the mechanisms and circuits are conditioned by a notch N-3 for such brake operation. As shown, the segment 310 is pivotally mounted on shaft 325 and is normally held in the "Did Not" position by lever 350, the end of which is pivotally connected to the lower portion of the segment through pin 331. The segment is adapted to be rocked to the "Did" position by lever 330, which extends rearwardly along the lower portion of arm 312, the rear end thereof is connected by pin 332 to the lower end of a yoke 333. The upper end of said yoke is pivotally mounted on shaft 335, extending a short distance therebeyond and having its end held in the retracted position shown by spring 336, the other end of which is fixed to arm 312.

Arm 340 is fixed at its upper end to turn with shaft 10, the lower end thereof being slidably connected to rod 341. Said rod 341 is adapted to be actuated by the brake pedal 87, one end thereof being pivotally connected to said pedal at 342. The opposite end of said rod extends slidably through arm 340 and is provided with a cone shaped enlargement 343. The brake pedal 87 is itself pivoted at 345, so that depression of the pedal against the tension of spring 346 will translate rod 341 to the left and permit arm 340 to also move in that direction under the influence of tension spring 347. Under normal conditions, that is when a brake incident has not been set up by one of the film notches N-3, a depression of the brake pedal results in a merely idle movement of arm 340 rocking rearward, said movement being limited by pin 348.

However, means are provided, during a brake-conditioned incident, for transmitting movement of arm 340 to lever 330 and thus position segment 310 in the "Did" printing position. For this purpose solenoid 350 is mounted on the rear part of printing arm 312 and is adapted to be energized by film notch N-3 through circuit 720 and disc B, previously described.

As embodied, the plunger 351 of solenoid 350 is pivotally connected at its lower end to the end of a latch 352, the opposite end of which is provided with an upwardly extending pawl 353. Said pawl is normally in the elevated position and there engages and restrains the end of the horizontal link 354, the other end of which is pivotally connected at 355 to the lower end of a bell crank 356, said bell crank being pivotally mounted on arm 312 at 357 and normally urged to move link 354 to the right by spring 358. When the pawl 353 is lowered by the energization of solenoid 350, link 354 slides rearwardly and against the bar 359 across the forwardly extending bottom part of yoke 333. This same movement also permits the cammed end 360 of link 361 to fall into position behind the bar 359 of yoke 333. Thus upon application of brake 87, spring 347 pulls arm 340 forward, rotating shaft 335 and thereby moving link 361 engaging yoke 333. When the link so engages with the yoke, the movement of arm 340 is transmitted to lever 330 and the segment thereby rocked to the "Did" printing position. When so moved the tooth of pawl 327 catches over pin 412 on the segment and, through pull of spring 413, holds the segment in that position.

Accordingly when the brake pedal is depressed during a period when solenoid 350 is energized through the control of a notch N–3 on the film, the word "Did" will be printed as indicated on the record sheet, Fig. 3, in connection with incident No. 5 for example.

Means are provided for restoring the above-described linkages to normal position for resetting in connection with a subsequent brake incident. As embodied the bell crank 356 has arm 365 extending rearwardly from the pivot so that its free end lies under cam 366 on the cam shaft 315. Thus continued rotation of the cam shaft after the printing has taken place will depress bellcrank arm 365 to withdraw link 354 beyond the toe of pawl 353, thereby restoring the mechanism for the next braking operation and in the meantime re-setting said linkages in the idle position.

Referring now to the embodied means for positioning the printing wheel 181 to print brake reaction times, as appears in Fig. 11 the periphery of the wheel is provided with characters from zero to 99 and is thus adapted to print reaction times in one-hundredths of a second. The wheel is mounted on horizontal shaft 370 which is free to rotate in its bearings near the front end of printing arm 312. Means are provided for rotating the wheel at a synchronous speed, through shaft 379 driven from synchronous motor 285 through clutch 316. The wheel is adapted to be driven by bevel gear 373 mounted on shaft 370 and engaging its mate 374 on the end of shaft 375. The other end of the latter shaft is provided with a toothed clutch member 376 fixed to rotate with the shaft but slidable thereon. The mating member 377 of the clutch is mounted at the end of shaft 378 to turn therewith, the other end of the shaft being geared to be driven by motor-driven shaft 379. Slidable clutch member 376 is pivotally connected to the lower arm 378 of bell crank 380 which is pivotally mounted on the side of arm 312 as shown and normally urged to rock in a counter-clockwise direction by tension spring 381. Thus member 376 of the clutch is normally being urged to close by the bell crank and spring.

Means are provided for permitting said clutch to close only when the system is conditioned for brake-reaction-time testing by means of a notch N–3, followed by notch N–2, on the movie film. As embodied, bell crank 380 is normally restrained from moving to close the clutch by pawl 385 on link 386, which lies in the path of bar 383 pivotally connected to the lower end of crank arm 378. Link 386 is pivotally connected to the lower end of plunger 387 of solenoid 388 by link 389. When said solenoid is energized by circuit control effected by a notch N–2, pawl 385 is retracted, releasing bar 383 and permitting clutch 376–377 to close. Notch N–2 effects this operation through line 100 leading to solenoid 388 (Fig. 2). Thus at the beginning of a brake reaction incident on the film, such as the turning on of a red light or the appearance of a pedestrian in the driver's path, a notch N–2 on the film will cause the timing wheel 181 to start rotating, while a notch N–3 will have conditioned the Did-Did Not circuit through solenoid 350 and closed clutch 316 to impart timing rotating to shaft 379.

The invention provides means for stopping the timing and printing wheel from further rotation as soon as the brake is applied (if applied within the one-second timing cycle allowed) and for holding it in the arrested position so that the characters corresponding to the brake reaction time can be printed on the score sheet. As previously described, application of the brake will cause arm 340 to move forward, also moving link latch 390 which has fallen to engage the cross bar 359 of yoke 333. This movement displaces bar 383 and bell crank 380 so as to disengage clutch members 376 and 377 and immediately terminate rotation of wheel 181.

Any residual movement of the wheel is prevented by engagement of pawl 396 with ratchet wheel 395, mounted on the inner face of wheel 181. Said pawl is normally held to lie against the ends of the ratchet teeth and urged to enter between them upon any backward turning of the wheel, being mounted to turn with shaft 405 and linked to the end of a link 397 which is linked in turn to the lower end of bell crank arm 398. Said bell crank, pivotally mounted on the side of the printing arm 312, is normally urged by spring 399 to hold pawl 396 in the position described above. A coil spring 400 is mounted about shaft 370 to hold same in tension, normally urging wheel 181 to turn clockwise and the pawl will instantly stop the wheel as soon as the power is released by disengagement of the clutch, as aforesaid. Thus the printing wheel will be stopped and held at that point in its timed turning which corresponds to the time elapsed between the beginning of the incident on the film and the application of the brake. While so held in that position the printing of the reaction time value as so set on the wheel may be effected by dropping the printing arm as previously described.

It will be understood that both the printing wheel and the segment may be set and printings made therefrom, but that in certain incidents the test relates only to whether the driver did or did not apply the brake (or other control), the timing thereof not being a critical factor in the test. In the typical score sheet shown in Fig. 3, incidents Nos. 1, 3 and 4 illustrate scoring of both factors, while incidents Nos. 2 and 5 show recording of the "Did" or "Did Not" factor only. In the latter case the printing wheel will remain set at 0 and no score will be entered on the reaction time column.

The invention also provides means for automatically resetting the printing wheel 181 and the printing segment 310 after the arm 312 has dropped to make impressions of the settings of those two members after the end of an incident. To return the wheel 181 to its zero position, it is necessary to withdraw pawl 396 from engagement with the ratchet teeth of wheel 395. As designed, pawl lever 396 is mounted intermediate its length to turn with shaft 405 and is also pivotally connected to the forward end of link 397. Thus a forward movement of link 397 will retract pawl 396. Such forward motion is imparted by cam 52 which depresses the end of arm 407 of the bell-crank 398 at the time required to reset the wheel 181 after printing has been effected. A stop pin 409 projects from the face of wheel 181 and abuts against angle stop 410 to hold the wheel in the zero position after release.

With reference to resetting of segment 310, same is normally held in the "Did Not" position as previously explained. When the segment is rocked to the "Did" position, the nose of pawl 326 hooks over pin 412 on the segment and is held there by the pull of spring 413. Cam 328, being on shaft 405, is rocked to depress the free end of lever 327 when said shaft is turned by the forward movement of link 397 as described above. When so depressed, as shown in Fig. 10, the segment is reset to its normal position simultaneously with the resetting of wheel 181.

The invention in its broader aspects is not limited to the specific mechanisms shown and described but departures may be made therefrom within the scope of the accompanying claims without departing from the principles of the invention and without sacrificing its chief advantages.

What is claimed is:

1. In a testing machine, in combination, a control adapted to be actuated by an operator, means for presenting to the operator an action scene calling for actuation of said control, and means responsive to said control for presenting a resultant scene corresponding to a correct actuation of said control and for presenting a different resultant scene upon operator failure to operate the control correctly.

2. In a testing machine, in combination, a projector for presenting a scene, a control to be actuated by an operator in response to a stimulus presented by the scene, a second projection, and means responsive to the actuation of said control and coupled with said second projector for actuating said second projector to present a different scene.

3. In a testing machine, in combination, a projector for presenting a scene, a control to be actuated by an operator viewing the scene, a second projector, means responsive to said control for actuating said second projector to present a different scene, and means for rendering the first projector ineffective during operation of the second projector.

4. In a testing machine, in combination, a plurality of vehicle-driving controls, a motion picture projector for presenting a scene to an operator at the controls, a second projector, means responsive to certain actuations of said controls for maintaining the first projector in operation and means responsive to other operations of said controls for setting the second projector into operation.

5. In a machine for testing the driver of a vehicle, in combination, a plurality of vehicle controls to be operated by the driver, means for graphically presenting to the driver a situation calling for actuation of said controls and means responsive to said controls for graphically illustrating to the driver the situation resulting from correct operation of said controls and for graphically illustrating to the driver a different situation resulting from incorrect operation of said controls.

6. In a machine for testing the driver of a vehicle, in combination, a plurality of vehicle controls to be operated by the driver, means for graphically presenting to the driver a situation calling for actuation of said controls, means responsive to said controls for graphically illustrating to the driver the situation resulting from correct operation of said controls and for graphically illustrating to the driver a different situation resulting from incorrect operation of said controls, and means coupled with said controls for recording actions of the driver after presentation of said first situation.

7. In a machine for testing the driver of a vehicle, in combination, a plurality of vehicle controls to be operated by the driver, means for graphically presenting to the driver a situation calling for actuation of said controls, means responsive to said controls for graphically illustrating to the driver the situation resulting from correct operation of said controls and for graphically illustrating to the driver a different situation resulting from incorrect operation of said controls, and printing means coupled with said controls for recording actions of the driver after presentation of said first situation.

8. In a driver testing machine, in combination, a projector for presenting a scene to the driver, means controlled by the driver for varying the speed of projection in order to vary the apparent speed of travel over said scene, and means for obscuring the projection of said scene when the projector is driven below a predetermined speed.

9. In a driver testing machine, in combination, a motor driven motion picture projector for presenting a moving road scene to a driver, an accelerator pedal, means controlled by the position of said pedal for varying the speed of the projector drive, and means also controlled by the accelerator pedal for governing the lighting circuit of said projector.

10. In a driver testing machine, in combination, a plurality of vehicle controls, a projector for imparting certain visual stimuli to a driver at the controls, and another projector for imparting other visual stimuli to said driver in response to the operation of said controls.

11. In a driver testing machine, in combination, a plurality of vehicle controls, a projector for imparting certain visual stimuli to a driver at the controls, and another projector for imparting other visual stimuli to said driver, and means controlled by the film in one of said projectors for selectively controlling the order of presentation of said stimuli from both said projectors.

12. In a testing machine, a projector including a film for presenting a scene to a driver to be tested, a plurality of vehicle controls to be operated in response to said scene, indicating means, switch means connected between said controls and said indicating means, means responsive to said film for actuating certain of said switches to selectively connect certain controls with said indicating means that are to be operated in response to said scene, means for presenting other stimuli to the driver and means responsive to the operation of said selected controls for controlling the presentation of the last said stimuli.

References Cited in the file of this patent

UNITED STATES PATENTS

| | | |
|---|---|---|
| Re. 23,030 | Holt | Aug. 24, 1948 |
| 1,564,138 | Rowland | Dec. 1, 1925 |
| 2,091,154 | Matzner | Aug. 24, 1937 |
| 2,179,663 | Link | Nov. 14, 1939 |
| 2,269,444 | Durham | Jan. 13, 1942 |
| 2,341,312 | Chedister | Feb. 8, 1944 |
| 2,373,313 | Jeandron | Apr. 10, 1945 |
| 2,392,142 | Gosswiller | Jan. 1, 1946 |
| 2,502,834 | Dreyer | Apr. 4, 1950 |
| 2,627,674 | Wilson | Feb. 10, 1953 |

FOREIGN PATENTS

| | | |
|---|---|---|
| 462,910 | Germany | July 19, 1928 |